United States Patent
Brinker et al.

(10) Patent No.: US 7,860,818 B2
(45) Date of Patent: Dec. 28, 2010

(54) SYSTEM AND METHOD FOR CASE-BASED MULTILABEL CLASSIFICATION AND RANKING

(75) Inventors: Klaus Brinker, Princeton, NJ (US); Claus Neubauer, Monmouth Junction, CT (US)

(73) Assignee: Siemens Corporation, Iselin, NJ (US)

( * ) Notice: Subject to any disclaimer, the term of this patent is extended or adjusted under 35 U.S.C. 154(b) by 861 days.

(21) Appl. No.: 11/764,824

(22) Filed: Jun. 19, 2007

(65) Prior Publication Data

US 2008/0010226 A1    Jan. 10, 2008

Related U.S. Application Data

(60) Provisional application No. 60/806,129, filed on Jun. 29, 2006.

(51) Int. Cl.
*G06N 5/00* (2006.01)
(52) U.S. Cl. .......................... 706/50; 706/45
(58) Field of Classification Search ............. 706/50, 706/45
See application file for complete search history.

(56) References Cited

U.S. PATENT DOCUMENTS

| 7,206,965 | B2 | 4/2007 | Roddy et al. |
| 2005/0154686 | A1 | 7/2005 | Corston |
| 2006/0112042 | A1 | 5/2006 | Platt et al. |

OTHER PUBLICATIONS

Pyle, Data Preparation for Data Mining, Morgan Kaufmann Publishers, Inc., 1999, pp. 1-466.*
Brinker, K et al., "A Unified Model for Multilabel Classification and Ranking", In Proceedings of the 17th European Conference on Artifical Intelligence, 2006.
Dwork, Cynthia et al., "Rank Aggregation Revisited", downloaded from http://citeseer.ist.psu.edu/cache/papers/cs/23611/http:zSzzSzwww.cs.berkeley. eduzSz~christoszSzgameszSzreadingszSzrank.pdf/rank-aggregation-revisited.pdf, downloaded on Jun. 15, 2007.
Fagin, Ronald et al., "Comparing and Aggregating Rankings with Ties", In Proceedings of 23rd ACM Symposium of PODS, pp. 47-58, 2004.
Furnkranz, Johannes et al., "Pairwise Preference Learning and Ranking", In Proceedings of ECML, pp. 145-156, 2003.
Hullermeier, Eyke et al., "Comparison of Ranking Procedures in Pairwise Preference Learning". In IPMU-04, pp. 535-542, 2004.

* cited by examiner

*Primary Examiner*—Wilbert L Starks, Jr.

(57) ABSTRACT

The present invention provides methods and apparatus for determining and utilizing case-based ranking methods, such as methods for machine condition monitoring. Specifically, the present invention provides a method for identifying and prioritizing labeled data. The method allows a monitored system to be associated with a calibrated and ordered set of states. Further, in machine condition monitoring, the machine condition is associated with the entire set of states in a particular order with one or more relevance zero-points. That is, a ranked set of calibrated data describing machine conditions is augmented with an annotation indicating a cut-off between relevant and non-relevant data.

25 Claims, 4 Drawing Sheets

SYSTEM AND METHOD FOR CASE-BASED MULTILABEL CLASSIFICATION AND RANKING

This application claims the benefit of U.S. Provisional Application No. 60/806,129, filed Jun. 29, 2006, which is incorporated herein by reference.

FIELD OF THE INVENTION

The present invention relates generally to machine learning, and more particularly to case-based approaches for multilabel classification and ranking.

BACKGROUND OF THE INVENTION

As industrial machinery has become more complex, machine condition monitoring has received increased attention and evolved into one of the most effective tools for maximizing the economic life-span of industrial machinery in various fields of application. Advanced machine learning techniques are among the key components for sophisticated monitoring systems and provide a means to automatically learn fault diagnosis models from sensor data (e.g., annotated historical data). One of the particular advantages of machine learning in condition monitoring is that the underlying diagnosis models can be adapted both to different application fields and time-shifting monitoring environments.

One of the most elementary scenarios in machine condition monitoring is to consider only two orthogonal states, namely, the alert state (e.g., indicating that the system requires specific attention to prevent possible failure or damage) and the non-alert state. More sophisticated systems model the machine to be associated with exactly one state from a finite, and typically small, set of alternatives, Systems such as these support a more fine-grained monitoring process such as a green, orange, and red alert scale, where the system states are assumed to be mutually exclusive. Adding even more flexibility, the machine condition might be characterized by a set of states (e.g., failure, alert, etc.) such that more than one state can be applicable at a particular point in time. Most prior models of a multi-alert system considered multiple binary monitoring systems where each binary system indicated whether a particular subsystem is in a critical (e.g., relevant, active, and/or alert) state. Some models were capable of ranking functionality and learning to determine a cut-off between active and non-active fault states (e.g., relevant and non-relevant faults), but were computationally costly.

Multilabel ranking (MLR) is a recent combination of two supervised learning tasks—multilabel classification (MLC) and label ranking (LR). MLC studies the problem of learning a model that associates with an instance x a bipartition of a predefined set of class labels into relevant (e.g., positive) and irrelevant (e.g., negative) labels, while the LR considers the problem to predict rankings of all class labels. MLR is a consistent combination of these two types of prediction. Thus, it can either be viewed as an extended ranking (e.g., containing additional information about a kind of "zero point"), or as an extended MLC (e.g., containing additional information about the order of labels in both parts of the bipartition). For example, in a document classification context, the intended meaning of the MLR is that, for the instance (=document) x, the classes (=topics) politics and economics are relevant, the former even more than the latter, whereas education and sports are irrelevant, the former less than the latter.

Considering MLC, the additional order information is not only useful by itself but also facilitates the post-processing of predictions (e.g., considering only the most relevant labels). MLR is not more demanding than MLC with respect to the training information (e.g., a multilabel ranker can well be trained on multilabel classification data). Also, inducing such a ranker can be useful even if the only interest is in a MLC. Basically, a MLR model consists of two components—a classifier and a ranker. The interdependencies between the labels which are learned by the ranker can be helpful in discovering and perhaps compensating for errors of the classifier. For example, the classifier may estimate one label to be relevant and a second label not relevant. The additional (e.g., conflicting) information that the latter is typically ranked above the former might call this estimation into question and thus repair the misclassification.

Existing approaches operating in ranking scenarios are typically model-based extensions of binary classification techniques which induce a global prediction model for the entire instance space from the training data. These approaches suffer substantially from the increased complexity of the target space in multilabel ranking in comparison to binary classification, thus having a high level of computational complexity already for a moderate number of class labels.

A common model-based approach to MLC is binary relevance learning (BR). BR trains a separate binary model $M_i$ for each label $\lambda_i$, using all examples x with $\lambda_i \in P_x$ as positive examples and all examples with $\lambda_i \in N_x$ as negative examples. To classify a new instance x, $\lambda_i$ is submitted to all models, and $P_x$ is defined by the set of all $\lambda_i$ for which $M_i$ predicts relevance.

BR can be extended to the MLR problem in a straightforward way if the binary models provide real-valued confidence scores as outputs. A ranking is then simply obtained by ordering the labels according to these scores. This approach suffers in that it is ad-hoc and has some disadvantages. For example, good estimations of calibrated scores (e.g., probabilities) are often hard to obtain. Further, this approach cannot be extended to more general types of preference relations such as partial orders.

Some model-based methods use a unified approach to calibrated label ranking which subsumes MLR as a special case. The framework enables general label ranking techniques, such as the model-based ranking by pairwise comparison (RPC) and constraint classification (CC), to incorporate and exploit partition-related information and to generalize to settings where predicting a separation between relevant and irrelevant labels is required. This approach does not assume the underlying binary classifiers provide confidence scores. Instead, this approach adds a virtual label as a split point between relevant and non-relevant labels where a calibrated ranking is simply a ranking of the extended label set $L \cup \{\lambda_0\}$. Such a ranking induces both a ranking among the labels L and a bipartite partition $(P_x, N_x)$ in a straightforward way. $P_x$ is given by those labels that are ranked higher than $\lambda_0$; $N_x$ by those labels that are ranked lower. Thus, every label $\lambda_i$ known to be relevant is preferred to the virtual label ($\lambda_i > \lambda_0$). Likewise, $\lambda_0$ is preferred to all non-relevant labels. Adding these preference constraints to the preferences that can be extracted for the regular labels, a calibrated ranking model can be learned by solving a conventional ranking problem with c+1 labels. However, these model-based approaches may become computationally costly.

With increasingly complex industrial machinery, the need to detect and/or remedy faults (e.g., alerts, failures, etc.) early has become critical. However, prior approaches to addressing multilabel classification and ranking used computationally intense modeling. Therefore, there exists a need for a less computationally intense approach.

SUMMARY OF THE INVENTION

The present invention provides improved methods and apparatus for large scale learning of complex ranking structures. Case-based methods of multilabel ranking indicate a cut-off between active and non-active fault states in machine condition monitoring.

One embodiment of the invention is a method for case-based multilabel ranking. The method includes receiving a set of labels partitioned into a first subset of labels and a second subset of labels, inserting one or more zero-points between the first subset of labels and the second subset of labels, determining generalized ranks for the labels and the one or more zero-points within the first subset of labels and the second subset of labels, aggregating the generalized ranks, and determining a consensus ranking for the labels based on the aggregated generalized ranks for the labels. In one embodiment, determining generalized ranks for the labels within the first subset of labels and the second subset of labels includes determining an average overall position of a label within the subset of labels that contains the label.

In other embodiments, a case-based multilabel ranking is utilized in machine condition monitoring. Generally, a prediction is made which ranks the labels and determines which labels are more relevant than a zero-point. In some alternatives, the ranking may determine when an output of machine faults (e.g., results from sensors) makes up a relevant fault. That is, the ranking may indicate if the faults are more relevant than the zero-point.

These and other advantages of the invention will be apparent to those of ordinary skill in the art by reference to the following detailed description and the accompanying drawings.

BRIEF DESCRIPTION OF THE FIGURES

FIG. 2 is a schematic illustration of multilabel ranking according to an embodiment of the present invention;

DETAILED DESCRIPTION

Generally, a general framework which allows a monitored system to be associated with a calibrated and ordered set of states is provided. That is, a condition is associated with an entire set of states (e.g., diagnosis level, alert states, etc.) in a particular order with a relevance zero-point. Such a ranking among the states may also be used to specify the order in which an operator should solve problems or process a list of action items. More generally, the monitoring system can be adjusted to support the specific usage of the ranking functionality through the historical data where the annotation reflects the interpretation of the ordering among the alternative states.

This general framework (e.g., learning algorithm) may be employed in applications other than fault diagnoses. For example, in document categorization, an ordered set of topics which are relevant for a given document (e.g., newspaper articles, emails, etc.) are predicted. If a relatively fine-grained set of topics is considered, there will typically be more than one topic which are relevant and should be assigned to the document. Moreover, some topics will be more relevant than others which gives rise to a ranking and, together with the relevance zero-point, a model underlying the above reasoning in machine condition monitoring. In another example, computational biology and in particular microarray analysis is another important field of application for predicting complex (e.g., calibrated) ranking structures. More precisely, the task of predicting a "qualitative" representation of gene expression profiles may be considered according to some embodiments of the present invention.

As mentioned above in the Background of the Invention, previous approaches to this category of learning problems are typically model-based extensions of less complex systems and entail a high demand of computational resources. The present invention provides a more integrated, highly scalable case-based approach which is conceptually appealing and amenable to theoretical analysis. Case-based approaches are based on the simple and powerful concept that similar problems can be solved using similar solutions. Accordingly, the present invention provides a sophisticated case-based framework for learning complex ranking structures.

Further, the present invention generally provides methods and apparatus for case-based multilabel ranking in machine condition monitoring. More specifically, the present invention provides a method for identifying and prioritizing fault diagnoses in machine condition monitoring using case-based aggregation approaches. A monitored system is associated with a labeled (e.g., annotated, etc.) and ordered (e.g., ranked using case-based methodologies) set of states (e.g., alerts, faults, conditions, diagnoses, levels, etc.). Further, the machine condition is associated with a set of states in a particular order with one or more relevance zero-points. That is, a ranked set of calibrated data describing machine conditions is augmented with an annotation indicating a cut-off between relevant and non-relevant data.

Label ranking (LR) is used to learn a mapping from an instance space X to rankings over a finite set of labels L= $\{\lambda_1 \ldots \lambda_c\}$. That is, a function that maps every instance $x \in X$ to a total strict order $>_x$, where $\lambda_i >_x \lambda_j$ means that, for this instance, label $\lambda_i$ is preferred to (e.g., ranked higher than) label $\lambda_j$. A ranking over L can conveniently be represented by a permutation $\tau$ of $\{1 \ldots c\}$, where $\tau(i)$ denotes the position of label $\lambda_i$ in the ranking. The set of all permutations over c labels, subsequently referred to as $S_c$, can hence be taken as the target space in label ranking.

Generally, multilabel ranking (MLR) is understood as learning a model that associates with a query input x both a ranking >, and a bipartition (e.g., multilabel classification (MLC)) of the label set L into relevant (e.g., positive) and non-relevant (e.g., negative) labels (e.g., subsets $P_x, N_x \subseteq L$ such that $P_x \cap N_x = 0$ and $P_x \cup N_x = L$). Furthermore, the ranking and the bipartition are consistent in the sense that $\lambda_i \in P_x$ and $\lambda_j \in N_x$ implies $\lambda_i >_x \lambda_j$. According to this consistency requirement, a bipartition $(P_x, N_x)$ implicitly also contains ranking information (e.g., relevant labels must be ranked above irrelevant ones). Accordingly, a MLR model can be trained on standard MLC data, even though it considers an extended prediction task.

Case-based algorithms defer processing the training data until an estimation for a new instance is requested—a property distinguishing them from model-based approaches. As a particular advantage of delayed processing, these learning methods may estimate the target function locally instead of inducing a global prediction model for the entire input domain from the data.

Figure 1:
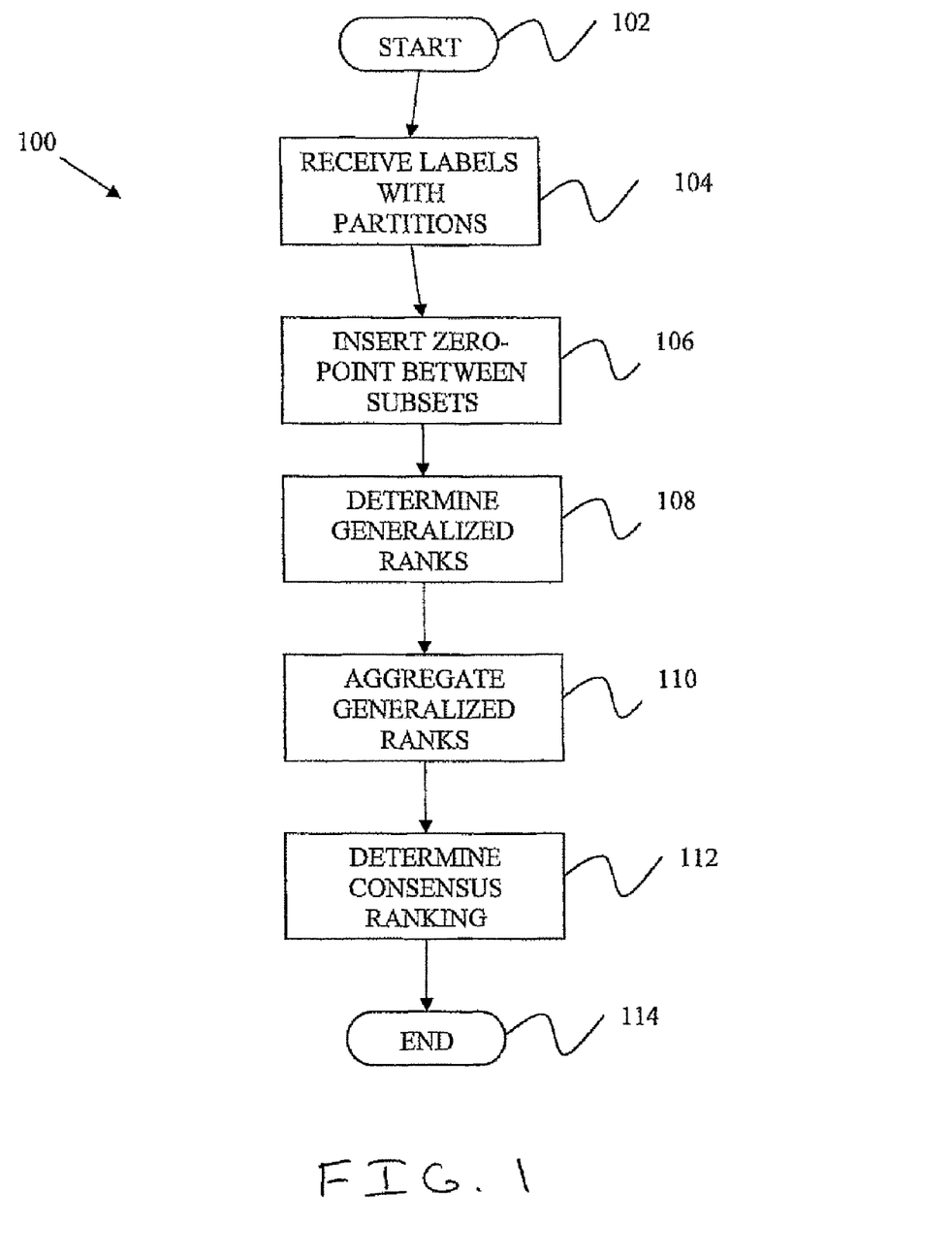
FIG. 1 depicts a case-based method for multilabel ranking according to embodiments of the present invention.

FIG. 1 depicts a case-based method 100 for multilabel ranking according to embodiments of the present invention. The method begins at step 102.

In step 104, a set of labels (e.g., a data set) with partitions (e.g., a calibrated label set) is received. The data set may, for example, be a set of training data and may be received in response to a query. The training data may comprise data acquired from sensors employed on and/or about industrial machinery, data in a sensor data archive, and/or data from another source. The sensor data may, for example, be a set of data from pressure sensors, temperatures sensors, etc.

The set of labels may be partitioned into subsets. The partitioning may come from an external source (e.g., a manual expert feed, etc.). This external source may be a memory device such as memory device 308 (discussed below) or other appropriate source of label information.

The labels may be partitioned into a first subset, which may include all relevant labels, and a second subset, which may include all non-relevant labels. In some embodiments, there may be more or less subsets. Additionally, any of the subsets may be an empty set. That is, there may be no relevant labels (e.g., the first subset is an empty set) and/or there may be no non-relevant labels (e.g., the second subset is an empty set).

In step 106, a zero-point is inserted between the partitioned subsets. That is, a relevance zero-point (e.g., a virtual label) may be placed such that the virtual label may be preferable to all non-relevant labels and less preferable than all relevant labels.

Considering an instance $(x, P_x, N_x)$ from a standard MLC training dataset, in calibrated ranking a virtual label $\lambda_0$ is introduced as a split point to separate labels from $P_x$ and $N_x$, respectively, and to associate a set of binary preferences with x. Instead of associating preferences, the present method 100 uses a more direct approach of viewing the sequence of the label sets $(P_x, \{\lambda_0\}, N_x)$ as a ranking with ties, also referred to as a "bucket order". More precisely, a bucket order is a transitive binary relation > for which there exists sets $B_1 \ldots B_m$ that form a partition of the domain D, given by $D=L \cup \{\lambda_0\}$, such that $\lambda > \lambda'$ if and only if there are i,j with i<j such that $\lambda \in B_i$ and $\lambda' \in B_j$. Using this notation, the MLR scenario corresponds to a generalized ranking setting with three "buckets", where $B_1=P_x$, $B_2=\{\lambda_0\}$, and $B_3=N_x$.

If the training data provides not only a bipartition but also a ranking with ties of labels within both parts, this additional information can be incorporated. Assuming that $P_x$ and $N_x$ form bucket orders $(B_1, \ldots, B_{i-1})$ and $(B_{i+1}, \ldots, B_j)$ respectively, this additional information may be combined into a single ranking with ties as $(B_1, \ldots, B_{i-1}, B_i, B_{i+1}, \ldots, B_j)$, where $B_i = \{\lambda_0\}$ represents the split point. Note that the analysis following method 100 only assumes that the training data can be converted into rankings with ties with the virtual label specifying the relevance split point. As such, it will cover both training data of the standard MLC case as well as the more complex MLR scenario.

In step 108, generalized ranks for the labels are determined. These generalized ranks may be for the relevant labels, the virtual label, and/or the non-relevant labels. A bucket order, as discussed in step 106, induces binary preferences among labels but moreover forms a representation for generalizing various metrics from strict rankings to rankings with ties. To this end, a generalized rank $\sigma(i)$ is defined for each label $\lambda_1 \in D$ as the average overall position $$\sigma(i) = \sum_{i<j} |B_i| + \frac{1}{2}(|B_j| + 1)$$

within the bucket $B_j$ which contains $\lambda_i$. Generalizations of well-known metrics such as Kendall's tau and the Spearman footrule distance may be used, where the Spearman footrule distance may be written as the $l_1$ distance of the generalized ranks $\sigma, \sigma'$ associated with the bucket orders $$l_1(\sigma, \sigma') = \sum_{\lambda_i \in D} |\sigma(i) - \sigma'(i)|.$$

In step 110, the generalized ranks of step 108 are aggregated. Given a metric l, a natural way to measure the quality of a single ranking $\sigma$ as an aggregation of the set of rankings $\sigma_1, \ldots, \sigma_K$ is to compute the sum of pairwise distances as $$L(\sigma) = \sum_{j=1}^{k} l(\sigma, \sigma_j).$$

Then, aggregation of rankings leads to the optimization problem of computing a consensus ranking $\sigma$, which is not necessarily unique, such that $L(\sigma) = \min_\tau L(\tau)$.

The k-nearest neighbor algorithm (k-NN) is a basic case-based learning method. In its simplest version, k-NN assumes all instances to be represented by feature vectors $x=([x]_1 \ldots [x]_N)^T$ in the N-dimensional space $X=R^N$ endowed with the standard Euclidian metric as a distance measure. It is noted that an extension to other instance spaces and more general distance measures $d(.,.)$ is straightforward.

When a query feature vector x is submitted to the k-NN algorithm, it retrieves (e.g., receives labels as in step 104) the k training instances closest to this point in terms of $d(.,.)$. In the case of classification learning, the k-NN algorithm estimates the query's class label by the most frequent label among these k neighbors. It can be adapted to the regression learning scenario by replacing the majority voting step with computing the weighted mean of the target values.

In order to extend the basic k-NN algorithm to multilabel learning, the aggregation step needs to be adapted in a suitable manner. To simplify the presentation, the standard MLC case is discussed herein where the training data provides only a bipartition into relevant and non-relevant labels for each instance. Below, incorporating more complex ranking (e.g., preference) data for training is discussed.

In step 112, a consensus (e.g., optimal, optimized, etc.) ranking for the labels based on the aggregated generalized ranks is determined. Here, well-known methods which compute approximately optimal solutions for the consensus optimization problem may be employed. This approach provides a general framework which allows use of any optimization technique (e.g., brute force or other known optimization techniques) suitable for a metric on rankings with ties in order to aggregate the k nearest neighbors for a query instance x.

The complexity of computing an optimal aggregation depends on the underlying metric and may form a bottleneck as this optimization problem is NP-hard for Kendall's tau and the Spearman footrule metric on bucket orders. Hence, computing an optimal aggregation is feasible only for relatively small label sets $\{\lambda_1 \ldots \lambda_c\}$. There exists, however, approximate algorithms with quadratic complexity in c which achieve a constant factor approximation to the minimal sum of distances L for Kendall's tau and the Spearman footrule metric.

The method ends at step 114. An in-depth discussion of aggregation analysis with respect to the method 100 of FIG. 1 continues below.

The Spearman rank correlation coefficient, a linear transformation of the sum of squared rank difference metric, is a well-known similarity measure on strict rankings. It can be generalized to the case of rankings with ties in the same way as the Spearman footrule metric, where integer rank values for strict rankings are substituted with average bucket locations. Hence, for any two bucket orders σ, σ', the generalized squared rank difference metric is defined as $$l_2(\sigma, \sigma') = \sum_{\lambda_i \in D} (\sigma(i) - \sigma'(i))^2.$$

The following theorem shows that an optimal aggregation of step 114 with respect to the $l_2$ metric can be computed by ordering the labels according to their generalized mean ranks.

Theorem: Let $\sigma_1, \ldots, \sigma_k$ be rankings with ties on $D = \{\lambda_1 \ldots \lambda_c\}$. Suppose σ is a permutation such that the labels $\lambda_i$ are ordered according to $$\frac{1}{k}\sum_{j=1}^{k} \sigma_j(i)$$

where ties are broken arbitrarily. Then, $$\sum_{j=1}^{k} l_2(\sigma, \sigma_j) \le \min_{\tau \in S_c} \sum_{j=1}^{k} l_2(\tau, \sigma_j).$$

It is noted that in the preceding theorem, the minimum is taken over $S_c$ while it is well-known that the minimizer in $R^c$ would be the mean rank vector. For strict rankings with unique mean rank values, the optimal-aggregation property has been proved.

The following proof is an adaptation of known work where the ranking by pairwise comparison voting procedure for complete strict rankings was analyzed in a probabilistic risk minimization scenario. An essential building block of this proof is the subsequent observation on permutations:

Lemma: Let $m_i$, $i=1 \ldots c$, be real numbers ordered such that $0 \le m_1 \le m \le \ldots \le m$. Then, for all permutations $$\tau \in S_c, \sum_{i=1}^{c} (i - m_i)^2 \le \sum_{i=1}^{c} (j - m_{\tau(i)})^2.$$

Proof: Define $m_i \stackrel{def}{=} \frac{1}{k}\sum_{j=1}^{k} \sigma_j(i), i = 1, \ldots c.$ -continued Then, $$\sum_{j=1}^{k} l_2(\tau, \sigma_j) = \sum_{j=1}^{k} \sum_{i=1}^{c} (\tau(i) - \sigma_j(i))^2$$

$$= \sum_{i=1}^{c} \sum_{j=1}^{k} (\tau(i) - m_i + m_i - \sigma_j(i))^2$$

$$= \sum_{i=1}^{c} \sum_{j=1}^{k} (\tau(i) - m_i)^2 - 2(\tau(i) - m_i).$$

$$(m_i - \sigma_j(i)) + (m_i - \sigma_j(i))^2$$

$$= \sum_{i=1}^{c} \left( \sum_{j=1}^{k} (\tau(i) - m_i)^2 - 2(\tau(i) - m_i) \right.$$

$$\left. \sum_{j=1}^{k} (m_i - \sigma_j(i)) + \sum_{j=1}^{k} (m_i - \sigma_j(i))^2 \right).$$

In the last equation, the mid-term equals 0 as:

$$\sum_{j=1}^{k} (m_i - \sigma_j(i)) = \sum_{j=1}^{k} \frac{1}{k} \sum_{l=1}^{k} \sigma_l(i) - \sum_{j=1}^{k} \sigma_j(i).$$

Furthermore, the last term is a constant $$t \stackrel{def}{=} \sum_{j=1}^{k} (m_i - \sigma_j(i))^2$$

which does not depend on τ. Hence, $$\sum_{j=1}^{k} l_2(\tau, \sigma_j) = ct + k \sum_{i=1}^{c} (\tau(i) - m_i)^2.$$

The proof follows directly from this lemma.

As discussed, $l_2$-optimal aggregation with respect to the set of permutations can be computed by ordering the labels according to their mean ranks. Regarding the complexity, this method requires computational time in the order of $O(kc+c \log c)$ for computing and sorting the mean ranks. Thus, it provides an efficient aggregation technique and an improvement over model-based approaches.

As stated above, the virtual label $\lambda_0$ is associated with the second bucket $B_2 = \{\lambda_0\}$ in order to provide a relevance split point. It may be observed that $l_2$-optimal rankings in k-NN multilabel ranking yield good performance with respect to standard evaluation measures on the ranking performance, while the accuracy in terms of multilabel classification measures reaches a reasonable level. However, particularly in the context of multilabel classification, virtual label $\lambda_0$ carries a special degree of importance and therefore misclassifications in the aggregation step should be penalized more strongly. In other words, reversing the preference between two labels is especially bad if one of these labels is $\lambda_0$, as it means misclassifying the second label in an MLC sense.

To combat this misclassification problem, the present approach can be extended in a consistent manner. That is, instead of a single virtual label $\lambda_0$, a set of virtual labels $\{\lambda_{0.1} \ldots \lambda_{0.p}\}$ which is associated with the split bucket $B_i$ is considered. In doing so, the theoretical analysis on the aggregation remains valid and the parameter p provides a means to control the penalty for misclassifications in aggregating rankings. Note that the computational complexity does not increase as the expansion into a set of virtual split labels can be conducted implicitly. Moreover, on computing a prediction, the set of virtual labels can be merged into a single label again in a consistent way as all labels have the same mean rank value.

To illustrate this "gap broadening" control mechanism, a simple aggregation example with three MLC-induced rankings using a single virtual label is observed:

$$\{\lambda_1\} > \{\lambda_0\} > \{\lambda_2, \lambda_3, \lambda_4, \lambda_5\}$$

$$\{\lambda_1\} > \{\lambda_0\} > \{\lambda_2, \lambda_3, \lambda_4, \lambda_5\}$$

$$\{\lambda_2\} > \{\lambda_0\} > \{\lambda_1, \lambda_3, \lambda_4, \lambda_5\}$$

These bucket orders would be aggregated into a total order such that P=$\phi$ and N=$\{\lambda_1 \ldots \lambda_5\}$ as $m_0$=2 (e.g., a mean rank of $\lambda_0$) and every other mean rank is greater, including $m_i$=2.417. Using a set of two virtual labels, we obtain $m_o$=$m_i$=2.5. Hence, the order of these labels is determined randomly. Finally, for three virtual labels, $m_0$=3 and $m_i$=2.83 such that the aggregated calibrated ranking corresponds to a multilabel classification P=$\{\lambda_1\}$ and N=$\{\lambda_2, \lambda_3, \lambda_4, \lambda_5\}$.

In accordance with the method 100, a subset of the entire training data (e.g., examples most similar to the query), may be received (e.g., retrieved) in step 104 and combined in order to make a prediction. This provides a manner for "explaining" a prediction, thus supporting a human-accessible estimation process. This estimation process may be used in certain applications where black-box predictions are not acceptable. For label ranking problems, this appealing property is difficult to realize in algorithms using complex global models of the target function as the more complex structure of the underlying target space typically entails solving multiple binary classification problems (e.g., RPC yields c(c+1)/2 sub-problems) or requires embedding the training data in a higher dimensional feature space to encode preference constraints, such as for constraint classification.

FIG. 2 is a schematic illustration 200 of multilabel ranking according to an embodiment of the present invention. Specifically, this illustration provides a representation of the principles of one or more virtual labels as discussed in method 100 above. In such an embodiment, multilabel ranking is used in machine condition monitoring. The machine condition may be associated with the entire set of states (e.g., diagnoses level, alert states, etc.) in a particular order with a relevance zero-point.

The representation of multilabel ranking in FIG. 2 may comprise one or more sets of labels 202*a-c*. Though depicted here with three alternative sets 202*a-c*, it is understood that any number of sets of labels 202 may be ranked according to the present invention.

For example, a machine (not shown) may receive set of labels 202*a*. The set of labels 202*a* may comprise relevant labels 204*a-b* (e.g., relevant alerts), which correspond to alert states 1 and 3, respectively. Thus, relevant labels 204*a-b* may make up the relevant subset 206, wherein relevant label 204*a* (e.g., alert state 1) is considered more critical and/or more likely than relevant label 204*b* (e.g., alert state 3). The set of labels 202*a* may further comprise non-relevant labels 208*a-b* (e.g., non-relevant alerts), which correspond to non-alert states 4 and 2, respectively. Thus, non-relevant labels 208*a-b* make up the non-relevant subset 210, wherein non-relevant label 208*a* (e.g., alert state 4) is considered more critical and/or more likely than non-relevant label 208*b* (e.g., alert state 2). A virtual label 212 (e.g., a virtual alert state) may be inserted between relevant subset 206 and non-relevant subset 210. The virtual label 212 may indicate the labels preceding it (e.g., labels 204*a-b*) are relevant and/or more critical than those labels following it (e.g., labels 208*a-b*).

Similarly, the set of labels 202*b* may be a calibrated ranking. The set of labels 202*b* may comprise relevant label 214 (e.g., the relevant alert), which corresponds to alert state 4. Thus, relevant label 214 makes up the relevant subset 216. The set 202*b* may further comprise non-relevant labels 218*a-c* (e.g., the non-relevant alerts), which correspond to non-alert states 2, 1, and 3, respectively. Thus, non-relevant labels 218*a-c* make up the non-relevant subset 220, wherein non-relevant label 218*a* (e.g., alert state 2) is considered more critical and/or more likely than non-relevant label 218*b* (e.g., alert state 1), which is in turn considered more critical and/or more likely than non-relevant label 218*c* (e.g., alert state 3). A virtual label 222 (e.g., a virtual alert state) may be inserted between relevant subset 216 and non-relevant subset 220. The virtual label 212 may indicate the label(s) preceding it (e.g., label 214) are relevant and/or more critical than those labels following it (e.g., labels 2185*a-c*).

In still another example, there may be a set of labels 202*c* (e.g., to be received as in step 104 of method 100). The set of labels 202*c* may comprise virtual label 224 (e.g., a virtual alert state) with no preceding relevant subset (e.g., the relevant subset is an empty set). The set 202*c* may further comprise non-relevant labels 226*a-d* (e.g., the non-relevant alerts), which correspond to non-alert states 1, 2, 3, and 4, respectively. Thus, non-relevant labels 226*a-d* make up the non-relevant subset 228. In this way, the machine condition may be said to be in an overall non-alert (e.g., non-relevant) state.

Figure 3:
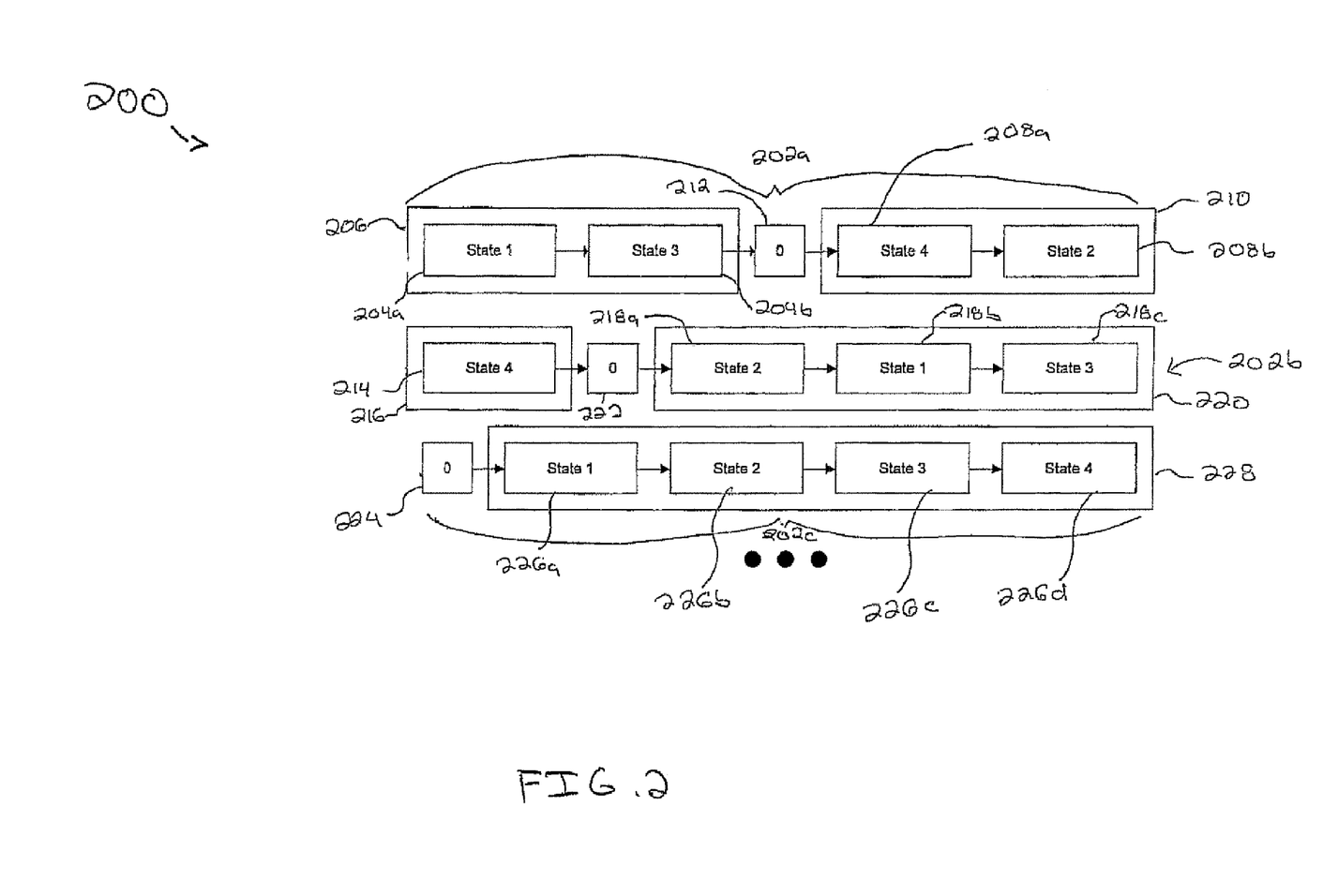
FIG. 3 is a schematic depiction of a system for use in machine condition monitoring and/or case-based multilabel ranking according to embodiments of the present invention.

FIG. 3 is a schematic depiction of a system 300 for use in machine condition monitoring and/or case-based multilabel ranking according to embodiments of the present invention. The system includes a controller 302 programmed to carry out the various detection and/or control methods and/or functions performed in the system 300. Controller 302 may be coupled to machine 304 and a plurality of sensors 306 so as to pass information therebetween. Sensors 306 may also be coupled to machine 304 so as to pass information therebetween.

The controller 302 may include one or more memory devices 308, which may be suitable for storing a program to control the controller 302 and/or performing the method steps of method 100.

Further, controller 302 and/or memory device 308 may be adapted to receive data from sensors 306 and store the data as historical sensor data and/or training data. The controller 302 and/or memory device 308 may be further adapted to utilize this data to construct and/or produce a detection model based on this data. Similarly, such data (e.g., training data) may be loaded onto and/or stored on memory 308 and/or controller 302 for subsequent use. The functions described herein with relation to controller 302 and/or memory device 308 may be performed by one or more computer processors that are executing computer program code, which defines the functionality described herein. One skilled in the art will also recognize that the functionality described herein may be implemented using hardware, software, and various combinations of hardware and software.

Further, one or more of the steps of method 100, method 400 (described below), or any other methods described herein may be implemented as one or more computer program products stored in a suitable computer readable medium (e.g., a carrier wave signal, hard drive, random access memory, etc.) on or about controller 302 and/or memory device 308.

For example, with respect to the method 100 of FIG. 1, the controller 302 and/or memory device 308 may acquire a data set from the sensors 306 in step 104. Alternatively, acquiring the data set may comprise using the controller 302 to retrieve the data set from the memory device 308 or another storage location. In step 106 the controller 302 and/or the memory device 308 partition the labels into a first subset of labels and a second subset of labels. In alternative embodiments, the data set is partitioned into multiple (e.g., 2, 3, 4, 5, etc.) subsets of labels. Following partitioning, the controller 302 and/or memory device 308 inserts one or more zero-points between the first subset of labels and the second subset of labels as shown in FIG. 2. In alternative embodiments comprising more than two subsets of labels, the zero-points are inserted between any two subsets of labels. Controller 302 and/or memory device 308 may be further configured to determine the generalized ranks for the labels as in step 110, aggregate the generalized ranks as in step 112, and/or determine a consensus ranking as in step 114 of method 100.

Figure 4:
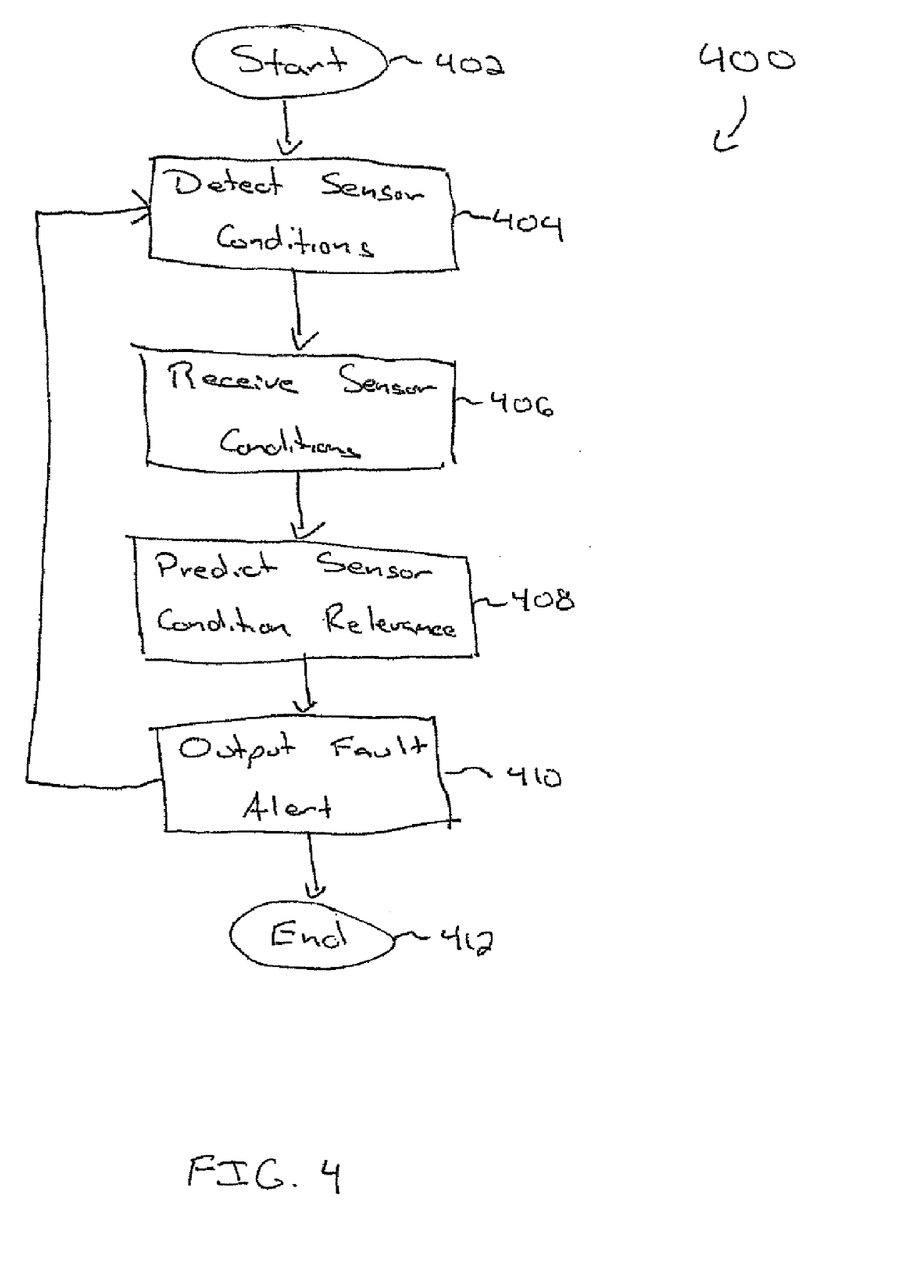
FIG. 4 depicts a method for machine condition monitoring using case based multilabel ranking according to embodiments of the present invention.

FIG. 4 depicts a method 400 for machine condition monitoring using case based multilabel ranking according to embodiments of the present invention. The method begins at step 402.

In step 404, sensor (e.g., alert, machine, fault, etc.) conditions are detected by the sensors 306 at one or more machines 304. The sensor conditions are transmitted to the controller 302.

In step 406, the controller 302 receives the sensor conditions from the sensors 306, receives a set of training data, and evaluates the sensor conditions using a case-based multilabel algorithm.

In step 408, the relevance of the sensor conditions received from the sensors 306 is predicted by the case-based multilabel algorithm employed by the controller 302. If the sensor conditions are predicted and/or determined to be relevant as described above with respect to the case-based multilabel algorithm, the method passes to step 410 and a fault alert is output. The fault alert of step 410 may comprise a machine condition, an alert, a ranking of critical faults amongst the sensors, a specified order in which an operator should address the faults, and/or any other appropriate response.

If the sensor conditions are determined to be non-relevant as described above with respect to the case-based multilabel algorithm (e.g., no subset of the fault conditions received from the sensors 306 is consistent with the predicted relevant subset of labels), the method passes back to step 404 for further fault and/or sensor monitoring. A machine condition such as indicating the machine is not in a fault condition may be output here. The method continues in this loop until passed through step 410 in a fault alert to the method end at step 412.

The foregoing description discloses only the preferred embodiments of the invention, modifications of the above disclosed systems and methods which fall within the scope of the invention will be readily apparent to those of ordinary skill in the art. For instance, additional, alternative, and/or overlapping models having a partition between relevant and non-relevant labels may be, utilized for machine condition monitoring. Additionally, though described herein for use in machine condition monitoring, it is understood that the methods of determining the model and/or employing the constructed models may be utilized in any applicable fields with similarly constructed data (e.g., text categorization, bioinformatics, etc).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A computer implemented case-based method of multi-label ranking comprising:
    receiving a set of labels partitioned into a first subset of labels and a second subset of labels;
    inserting one or more zero-points between the first subset of labels and the second subset of labels;
    determining generalized ranks for the labels and the one or more zero-points within the first subset of labels and the second subset of labels;
    aggregating the generalized ranks; and
    determining a consensus ranking for the labels based on the aggregated generalized ranks for the labels.

2. The method of claim 1 wherein the first subset of labels are relevant and the second subset of labels are non-relevant.

3. The method of claim 1 wherein determining generalized ranks for the labels within the first subset of labels and the second subset of labels comprises:
    determining an average overall position of a label within the subset of labels that contains the label.

4. The method of claim 3 wherein the average overall position $\sigma(i)$ of a label $\lambda_i$ is $$\sigma(i) = \sum_{l<j} |B_l| + \frac{1}{2}(|B_j| + 1),$$

wherein:
    $B_l$ is the subset of labels that does not contain $\lambda_i$; and
    $B_j$ is the subset of labels that contains $\lambda_i$.

5. The method of claim 1 wherein aggregating the generalized ranks comprises:
    aggregating the generalized ranks using Spearman's footrule metric.

6. The method of claim 1 wherein aggregating the generalized ranks comprises:
    aggregating the generalized ranks using Kendall's tau.

7. The method of claim 1 wherein determining a consensus ranking for the labels comprises:
    determining $L(\sigma)=\min_\tau L(\tau)$ wherein:
        $L(\sigma)$ is the distance to a consensus ranking; and
        $\tau$ is the label's rank correlation coefficient.

8. A computer implemented apparatus for case-based multilabel ranking comprising:
    means for receiving a set of labels partitioned into a first subset of labels and a second subset of labels;
    means for inserting one or more zero-points between the first subset of labels and the second subset of labels;

means for determining generalized ranks for the labels within the first subset of labels and the second subset of labels;

means for aggregating the generalized ranks; and means for determining a consensus ranking for the labels based on the aggregated generalized ranks for the labels.

9. The apparatus of claim 8 wherein the first subset of labels are relevant and the second subset of labels are non-relevant.

10. The apparatus of claim 8 wherein the means for determining generalized ranks for the labels within the first subset of labels and the second subset of labels comprises:

means for determining an average overall position of a label within the subset of labels that contains the label.

11. The apparatus of claim 10 wherein the average overall position $\sigma(i)$ of a label $\lambda_i$ is $$\sigma(i) = \sum_{l<j} |B_l| + \frac{1}{2}(|B_j|+1),$$

wherein:
B$_i$ is the subset of labels that does not contain $\lambda_i$; and
B$_j$ is the subset of labels that contains $\lambda_i$.

12. The apparatus of claim 8 wherein the means for aggregating the generalized ranks comprises:

means for aggregating the generalized ranks using Spearman's footrule metric.

13. The apparatus of claim 8 wherein the means for aggregating the generalized ranks comprises:

means for aggregating the generalized ranks using Kendall's tau.

14. The apparatus of claim 8 wherein the means for determining a consensus ranking for the labels comprises:

means for determining $L(\sigma)=\min_\tau L(\tau)$ wherein:
$L(\sigma)$ is the distance to a consensus ranking; and
$\tau$ is the label's rank correlation coefficient.

15. A machine readable medium having computer program instructions stored thereon, the instructions capable of execution by a processor and defining the steps of:

receiving a set of labels partitioned into a first subset of labels and a second subset of labels;

inserting one or more zero-points between the first subset of labels and the second subset of labels;

determining generalized ranks for the labels within the first subset of labels and the second subset of labels;

aggregating the generalized ranks; and determining a consensus ranking for the labels based on the aggregated generalized ranks for the labels.

16. The machine readable medium of claim 15 wherein the first subset of labels are relevant and the second subset of labels are non-relevant.

17. The machine readable medium of claim 15, wherein the instructions for determining generalized ranks for the labels within the first subset of labels and the second subset of labels further define the step of:

determining an average overall position of a label within the subset of labels that contains the label.

18. The machine readable medium of claim 17 wherein the average overall position $\sigma(i)$ of a label $\lambda_i$ is $$\sigma(i) = \sum_{l<j} |B_l| + \frac{1}{2}(|B_j|+1),$$

wherein:
B$_i$ is the subset of labels that does not contain $\lambda_i$; and
B$_j$ is the subset of labels that contains $\lambda_i$.

19. The machine readable medium of claim 15, wherein the instructions for aggregating the generalized ranks further define the step of:

aggregating the generalized ranks using Spearman's footrule metric.

20. The machine readable medium of claim 15, wherein the instructions for aggregating the generalized ranks further define the step of:

aggregating the generalized ranks using Kendall's tau.

21. The machine readable medium of claim 15, wherein the instructions for determining a consensus ranking for the labels further define the step of:

determining $L(\sigma)=\min_\tau L(\tau)$ wherein:
$L(\sigma)$ is the distance to a consensus ranking; and
T is the label's rank correlation coefficient.

22. A method of machine condition monitoring comprising:

monitoring a plurality of sensors adapted to detect machine condition information;

evaluating the machine condition information by employing a case-based multilabel algorithm predicting a zero-point between a first subset of labels and a second subset of labels; and, outputting an evaluated machine condition from the case-based multilabel algorithm with a zero-point between the first subset of labels and the second subset of labels based on the machine condition information.

23. The method of claim 22 wherein the first subset of labels are relevant and the second subset of labels are non-relevant.

24. The method of claim 22 wherein one of the subsets of labels is an empty set.

25. The method of claim 22 wherein employing a case-based multilabel algorithm comprises:

receiving a set of training data partitioned into a first subset and a second subset;

inserting one or more zero-points between the first subset and the second subset;

determining generalized ranks for the training data and the one or more zero-points within the first subset and the second subset;

aggregating the generalized ranks; and determining a consensus ranking for the training data based on the aggregated generalized ranks.

* * * * *